(12) United States Patent
Ootomo et al.

(10) Patent No.: US 7,471,235 B2
(45) Date of Patent: Dec. 30, 2008

(54) MODE S TRANSPONDER TRANSMISSION SIGNAL DECODER AND MODE S TRANSPONDER TRANSMISSION SIGNAL DECODING METHOD

(75) Inventors: Hisashi Ootomo, Kawasaki (JP); Yoshirou Aoki, Yokohama (JP); Yoshinori Kuji, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/960,464

(22) Filed: Dec. 19, 2007

(65) Prior Publication Data

US 2008/0106456 A1 May 8, 2008

Related U.S. Application Data

(62) Division of application No. 11/283,816, filed on Nov. 22, 2005, now Pat. No. 7,391,359.

(30) Foreign Application Priority Data

Dec. 3, 2004 (JP) .............................. 2004-351163

(51) Int. Cl.
*G01S 13/74* (2006.01)
*G01S 7/285* (2006.01)
*G01S 13/91* (2006.01)
*G01S 13/93* (2006.01)
*G01S 13/00* (2006.01)

(52) U.S. Cl. ............................. 342/37; 342/29; 342/30; 342/32; 342/36; 342/42; 342/43; 342/51; 342/89; 342/175; 342/189; 342/195

(58) Field of Classification Search ............. 342/29–51, 342/89–103, 159, 175, 189, 194–197; 375/239, 375/242–254, 316–352
See application file for complete search history.

(56) References Cited

U.S. PATENT DOCUMENTS 5,063,386 A * 11/1991 Bourdeau et al. ............. 342/40
5,089,822 A * 2/1992 Abaunza et al. ............... 342/30

(Continued)

OTHER PUBLICATIONS

E. Chang et al., "The Story of Mode S"; posted on the Internet at mit.edu; dated Dec. 15, 2000; Massachusetts Institute of Technology; Cambridge, Massacheusetts, U.S.A.*

(Continued)

*Primary Examiner*—Bernarr E Gregory
(74) *Attorney, Agent, or Firm*—Oblon, Spivak, McClelland, Maier & Neustadt, P.C.

(57) ABSTRACT

There are provided a differential processing unit which performs differential processing for a Mode S transponder transmission signal, an auto correlation arithmetic operation unit which performs an arithmetic operation of a degree of auto correlation between an increasing change rate and decreasing change rate of a power level in the signal which has been subjected to the differential processing, a pulse regeneration unit which regenerates a pulse based on the degree of auto correlation, which has been obtained by the auto correlation arithmetic operation processing, a pulse phase locked loop unit which performs gate processing and phase locked processing for the regenerated pulse, and a pulse decoding unit which decodes the Mode S transponder transmission signal based on the pulse which has been subjected to the gate processing and the phase locked processing.

2 Claims, 12 Drawing Sheets

U.S. PATENT DOCUMENTS

| | | | |
|---|---|---|---|
| 5,406,288 A * | 4/1995 | Billaud et al. | 342/37 |
| 6,222,480 B1 * | 4/2001 | Kuntman et al. | 342/30 |
| 6,628,225 B2 * | 9/2003 | Sanford | 342/32 |
| 6,768,445 B1 * | 7/2004 | Johnson | 342/32 |
| 6,788,245 B1 * | 9/2004 | Johnson | 342/32 |
| 6,819,282 B1 * | 11/2004 | Galati et al. | 342/37 |
| 6,856,274 B1 * | 2/2005 | Johnson | 342/32 |
| 7,015,856 B1 * | 3/2006 | Johnson | 342/32 |
| 7,391,359 B2 * | 6/2008 | Ootomo et al. | 342/37 |

OTHER PUBLICATIONS

Michael C. Stevens, "Secondary Surellance Radar", 1988, 12.3 Reply format (pp. 257-258), 12.6 Replay types (pp. 267-268).

"Aeronautical Telecommunications", Annex 10 to the Convention on International Civil Aviation organization, Third Edition, 3.1.2.3.2 Formats of Mode S Interrogations and Replies, Jul. 2002, pp. 2.

* cited by examiner

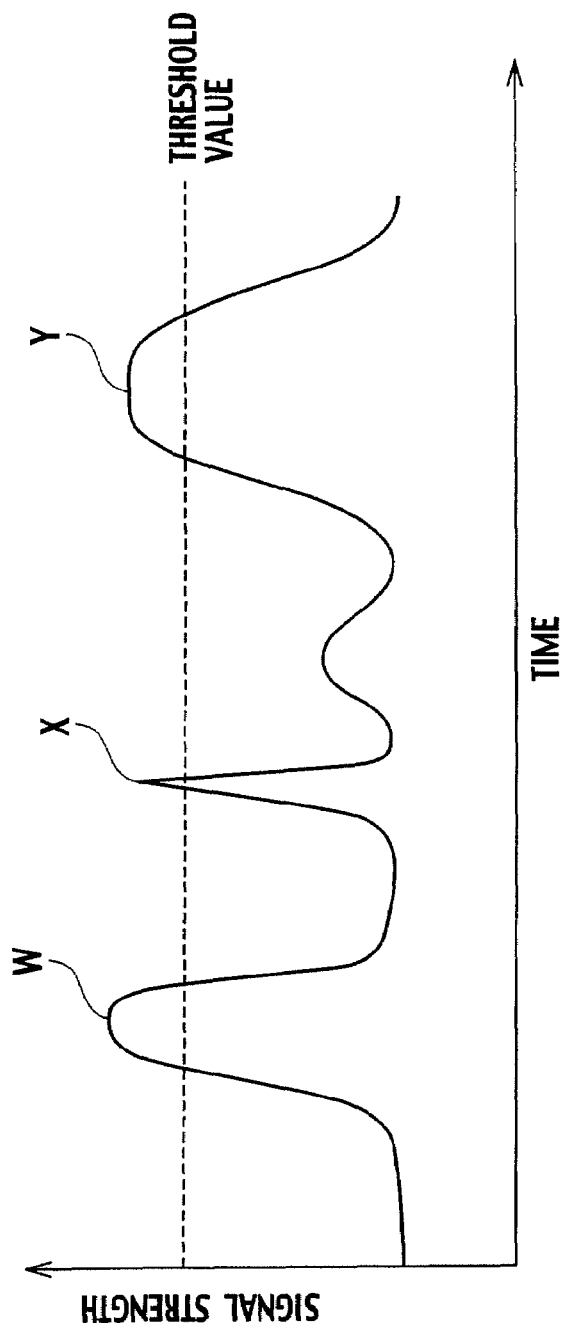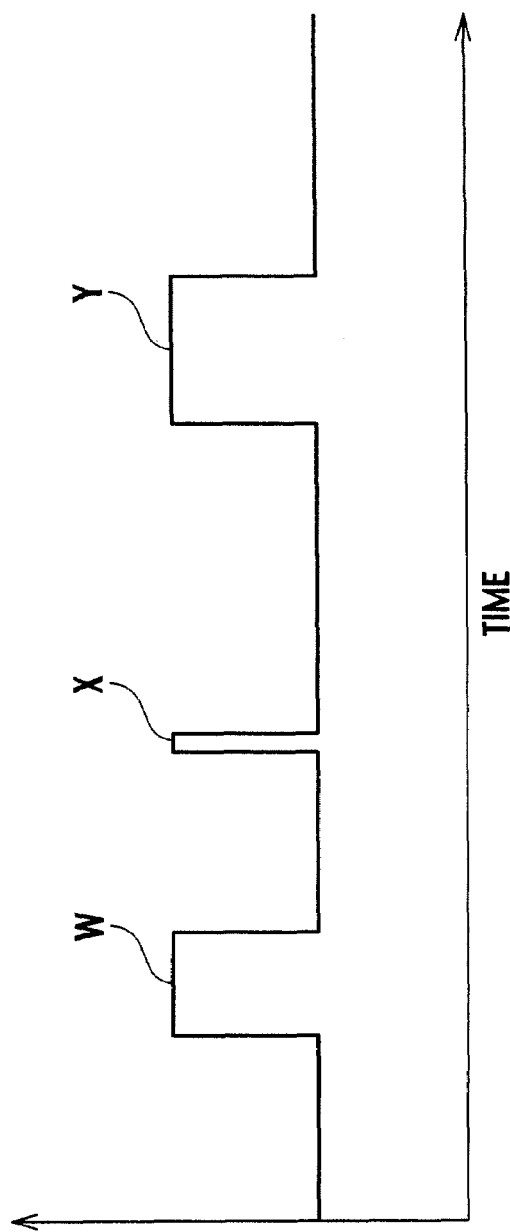
FIG. 1A PRIOR ART
FIG. 1B PRIOR ART

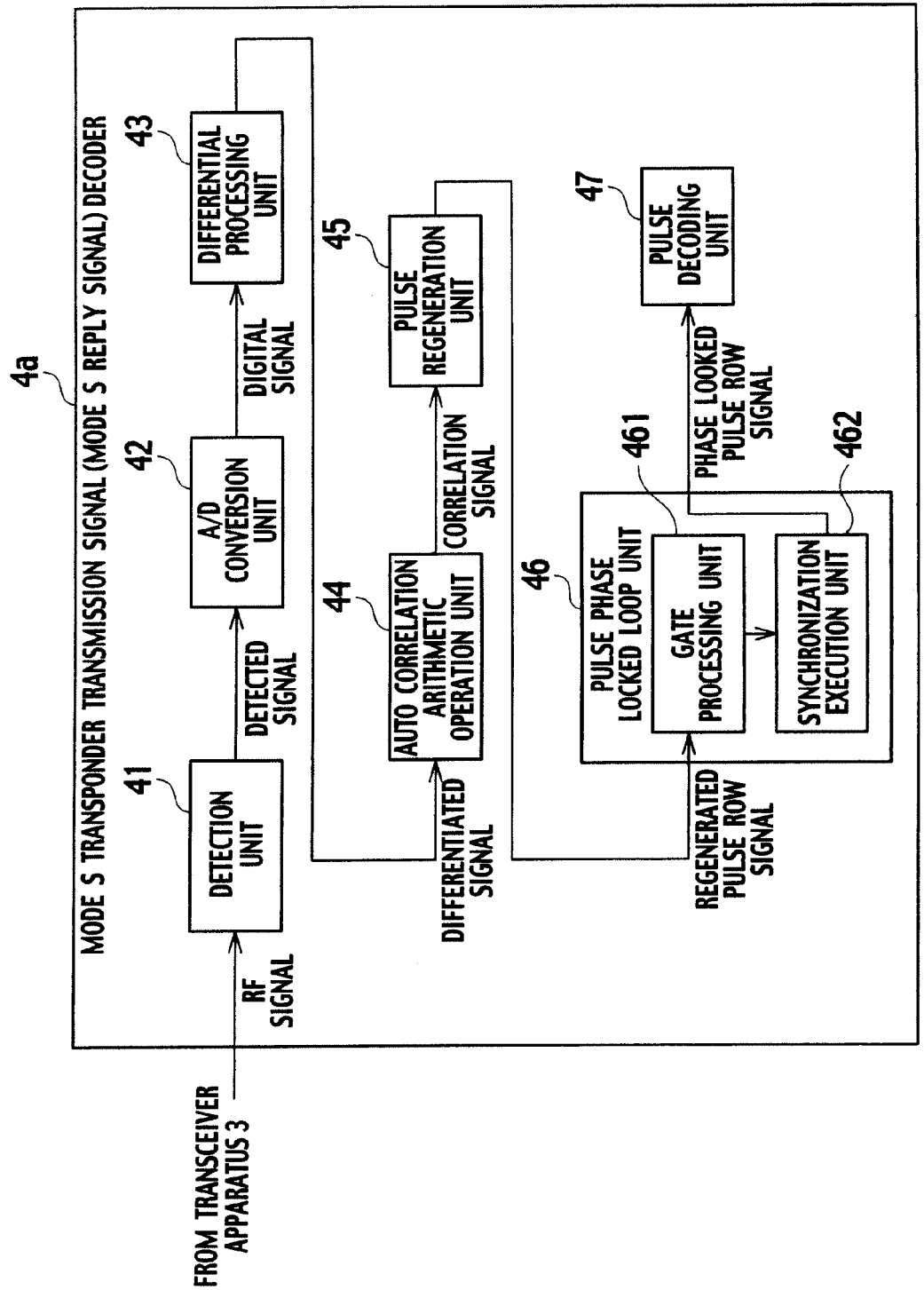

MODE S TRANSPONDER TRANSMISSION SIGNAL DECODER AND MODE S TRANSPONDER TRANSMISSION SIGNAL DECODING METHOD

CROSS-REFERENCE TO RELATED ART

This application is a Divisional of and claims the benefit of priority under 35 USC § 120 from U.S. Ser. No. 11/283,816, filed Nov. 22, 2005, now U.S. Pat. No. 7,391,359 and claims the benefit of priority from the prior Japanese Application No. 2004-351163, filed on Dec. 3, 2004; the entire contents of which are incorporated herein by reference.

BACKGROUND OF THE INVENTION

1. Field of the Invention

The present invention relates to a Mode S transponder transmission signal decoder and a Mode S transponder transmission signal decoding method for decoding a Mode S reply signal to a Mode S interrogation signal transmitted to a transponder mounted on an aircraft, and a decoding Mode S squitter signal (including a Mode S short squitter signal and a Mode S extended squitter signal) transmitted by the transponder.

2. Description of the Related Art

An aircraft surveillance radar for use in air traffic control is broadly divided into a primary surveillance radar (PSR) and a secondary surveillance radar (SSR).

The above-described PSR emits radio waves from the ground, and receives and processes reflected waves thereof, thereby acquiring positional information of an aircraft.

Meanwhile, the SSR transmits an interrogation signal from the ground, receives a reply signal thereto from a transponder, thereby acquiring a variety of information regarding the aircraft.

Note that modes of the SSR are classified into a Mode A, a Mode C, and a Mode S depending on types of the information to be acquired, in which the Mode A is one for acquiring identification information of the aircraft, the Mode C is one for acquiring altitude information, and the Mode S is one for acquiring track information, speed information, and the like in addition to the above-described information (refer to HASHIDA Yoshio, OOTOMO Hisashi, and KUJI Yoshinori, "Secondary Surveillance Radar for Air Traffic Control—SSR Mode S", Toshiba Review, Vol. 59, No. 2 (2004), pp. 58-61).

Moreover, a transponder for the Mode S has a function to transmit a Mode S short squitter signal, which has a signal format similar to that of a Mode S reply signal and is composed of a 24-bit address, and to transmit a Mode S extended squitter signal, which has also the signal format similar to that of the Mode S reply signal and represents a position, a speed, and the like of the aircraft itself. Note that, in the following description, the above-described Mode S short squitter signal and Mode S extended squitter signal are collectively referred to as a "Mode S squitter signal" as appropriate.

The above-described Mode S squitter signal is automatically transmitted from the Mode S transponder at a fixed interval, and is receivable not only at a ground station but also at the aircraft. Therefore, the Mode S squitter signal can be used for automatic dependent surveillance broad assistance (ADS-B).

In the case of decoding the above-described SSR Mode S reply signal and Mode S squitter signal, a threshold value has been set as shown in FIG. 1A, and portions, where outputs are larger than the threshold value, and pulse widths are within a predetermined range as shown in FIG. 1B, have been recognized as such signals.

Note that FIG. 1B shows the case where a width of a pulse W is within the predetermined range, a width of a pulse X does not meet a lower limit value of the predetermined range, and a width of a pulse Y exceeds an upper limit value of the predetermined range. Specifically, only the pulse W is recognized as a correct signal.

However, as shown in FIG. 2A, a direct wave 104 of the Mode S reply signal transmitted from an aircraft 101 to a ground station 102 in response to a Mode S interrogation signal 103 from the ground station 102 is sometimes subjected to interference from a reflected wave 105 of the same Mode S reply signal. Moreover, this phenomenon sometimes occurs also in the case of receiving the Mode S squitter signal.

Note that, in the following description, the above-described Mode S reply signal and Mode S squitter signal are collectively referred to as a "Mode S transponder transmission signal" as appropriate.

The interference as described above by the reflective wave is caused by a phase difference between access routes, and a power level P of the Mode S transponder transmission signal received by the ground station 102 is represented by the following expression.

$$P = \alpha \sin \omega t + B \sin(\omega(t+d)) \qquad (1)$$

Note that, in the above-described Expression (1), P is the receiving power level, α is an attenuation of the direct wave, B is an attenuation of the reflected wave, and d is a time difference of arrival.

Moreover, when there is a plurality of aircrafts within a surveillance range of the ground station 102 as shown in FIG. 2B, the Mode S transponder transmission signal 104 from the aircraft 101 and a Mode S transponder transmission signal (asynchronous signal) 107 from an aircraft 106 sometimes interfere with each other.

Specifically, if it is assumed that a pulse shown in FIG. 3A is the direct wave 104, and that a pulse shown in FIG. 3B is the reflected wave 105 or the asynchronous signal 107, an associated wave as shown in FIG. 3C is formed when phases of these two pulses are the same. A pulse of the associated wave is misidentified so as to exceed the upper limit value of the above-described predetermined range, and as a result, the pulse concerned is not recognized as the correct signal. Hence, it becomes impossible to correctly decode the Mode S transponder transmission signal.

Meanwhile, when the phases of the two pulses are different from each other, an associated wave as shown in FIG. 3D is formed. A pulse of the associated wave is misidentified so as not to meet the lower limit value of the above-described predetermined range, and as a result, the pulse concerned is not recognized as the correct signal. Hence, it becomes impossible to correctly decode the Mode S transponder transmission signal as in the case shown in FIG. 3C.

SUMMARY OF THE INVENTION

In consideration of the circumstances as described above, it is an object of the present invention to provide a Mode S transponder transmission signal decoder and a Mode S transponder transmission signal decoding method, which are capable of correctly decoding the Mode S transponder transmission signal.

A first aspect of the present invention provides a Mode S transponder transmission signal decoder for decoding a Mode S transponder transmission signal transmitted by a transponder mounted on an aircraft, including: a differential processing unit which performs differential processing for the Mode S transponder transmission signal; an auto correlation arithmetic operation unit which performs an arithmetic operation of a degree of auto correlation between an increasing change rate and decreasing change rate of a power level in the signal which has been subjected to the differential processing; a pulse regeneration unit which specifies a position of a pulse in the signal which has been subjected to the auto correlation arithmetic operation processing and regenerating the pulse based on the degree of auto correlation and a standard of a Mode S signal, the degree having been obtained by the auto correlation arithmetic operation processing; a phase locked loop unit which performs gate processing and phase locked processing for the regenerated pulse based on the standard of the Mode S signal; and a decoding unit which decodes the Mode S transponder transmission signal based on the pulse which has been subjected to the gate processing and the phase locked processing.

A second aspect of the present invention provides a Mode S transponder transmission signal decoder for decoding a Mode S transponder transmission signal transmitted by a transponder mounted on an aircraft, including: a differential processing unit which performs differential processing for the Mode S transponder transmission signal; an auto correlation arithmetic operation unit which performs an arithmetic operation of a degree of auto correlation between an increasing change rate and decreasing change rate of a power level in the signal which has been subjected to the differential processing; a pulse regeneration unit which specifies a position of a pulse in the signal which has been subjected to the auto correlation arithmetic operation processing and regenerating the pulse based on the degree of auto correlation and a standard of a Mode S signal, the degree having been obtained by the auto correlation arithmetic operation processing; a pattern selection unit which selects a pattern of the pulse, the pattern most closely resembling a pattern of the regenerated pulse, from patterns of pulses defined by the standard of the Mode S signal; a position synchronization unit which performs pulse position synchronization processing based on the selected pattern of the pulse; and a decoding unit which decodes the Mode S transponder transmission signal based on the pulse which has been subjected to the pulse position synchronization processing, wherein the position synchronization unit includes a correction value calculation unit which calculates a correction value of an error when the error occurs in a reference position in the case of selecting the resembling pattern of the pulse, and the pattern selection unit sequentially corrects the reference position based on the correction value.

A third aspect of the present invention provides a Mode S transponder transmission signal decoding method for decoding a Mode S transponder transmission signal transmitted by a transponder mounted on an aircraft, comprising: performing differential processing for the Mode S transponder transmission signal; performing an arithmetic operation of a degree of auto correlation between an increasing change rate and decreasing change rate of a power level in the signal which has been subjected to the differential processing; specifying a position of a pulse in the signal which has been subjected to the auto correlation arithmetic operation processing and regenerating the pulse based on the degree of auto correlation and a standard of a Mode S signal, the degree having been obtained by the auto correlation arithmetic operation processing; performing gate processing and phase locked processing for the regenerated pulse based on the standard of the Mode S signal; and decoding the Mode S transponder transmission signal based on the pulse which has been subjected to the gate processing and the phase locked processing.

A fourth aspect of the present invention provides a Mode S transponder transmission signal decoding method for decoding a Mode S transponder transmission signal transmitted by a transponder mounted on an aircraft, comprising: performing differential processing for the Mode S transponder transmission signal; performing an arithmetic operation of a degree of auto correlation between an increasing change rate and decreasing change rate of a power level in the signal which has been subjected to the differential processing; specifying a position of a pulse in the signal which has been subjected to the auto correlation arithmetic operation processing and regenerating the pulse based on the degree of auto correlation and a standard of a Mode S signal, the degree having been obtained by the auto correlation arithmetic operation processing; selecting a pattern of the pulse, the pattern most closely resembling a pattern of the regenerated pulse, from patterns of pulses defined by the standard of the Mode S signal; performing pulse position synchronization processing based on the selected pattern of the pulse; and decoding the Mode S transponder transmission signal based on the pulse which has been subjected to the pulse position synchronization processing, wherein the pulse position synchronization processing step includes calculating a correction value of an error when the error occurs in a reference position in a case of selecting the resembling pattern of the pulse, and in the pulse pattern selection step, the reference position is sequentially corrected based on the correction value.

In the above-described aspects of the present invention, in the case of decoding the Mode S transponder transmission signal, the differential processing, the auto correlation arithmetic operation processing, the pulse regeneration processing, the gate processing, and the phase locked processing are performed.

Alternatively, the differential processing, the auto correlation arithmetic operation processing, the pulse regeneration processing, the pattern selection processing, the position synchronization processing, and the correction value calculation processing are performed.

Hence, it is made possible to accurately decode the Mode S transponder transmission signal.

BRIEF DESCRIPTION OF THE DRAWINGS

FIGS. 1A and 1B are diagrams for explaining a decoding method of a conventional reply signal.

FIG. 5 is a diagram showing a configuration of a Mode S reply signal decoder according to the first embodiment of the present invention.

DETAILED DESCRIPTION OF THE INVENTION

Figure 2A:
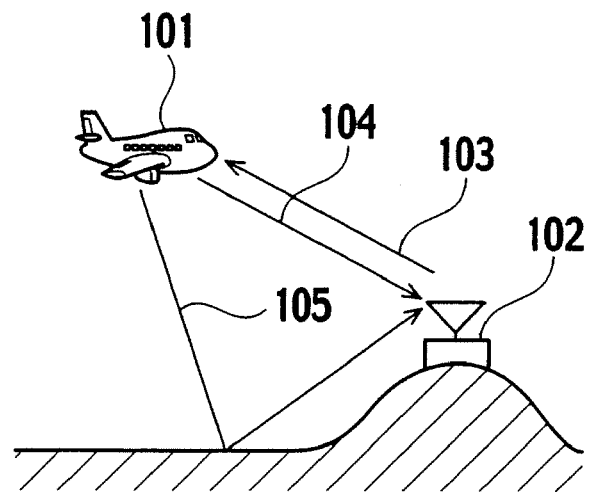
FIGS. 2A and 2B are views for explaining reflection and interference of the conventional reply signal.
Figure 2B:
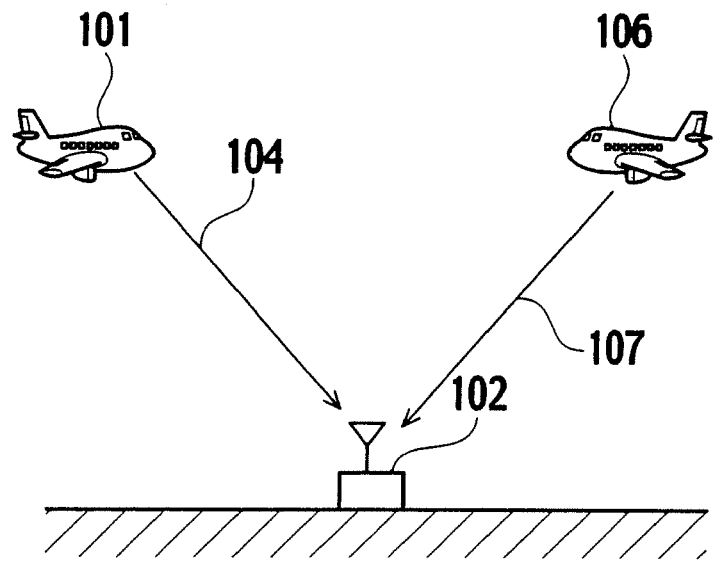
Figure 3A:
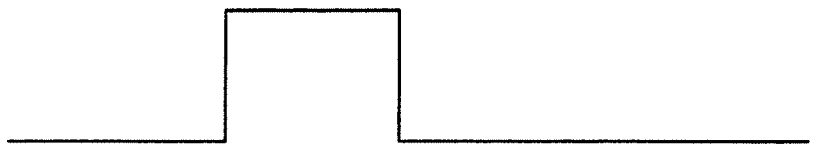
FIGS. 3A to 3D are diagrams for explaining a pulse change of the conventional reply signal.
Figure 3B:
Figure 3C:
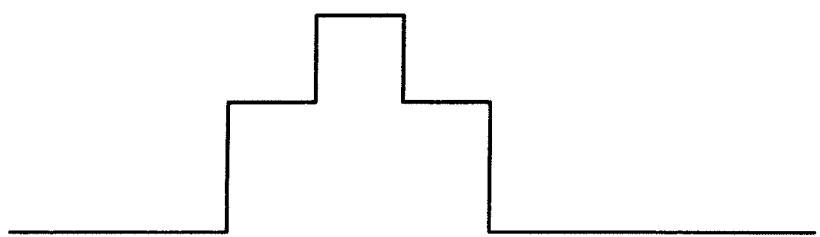
Figure 3D:
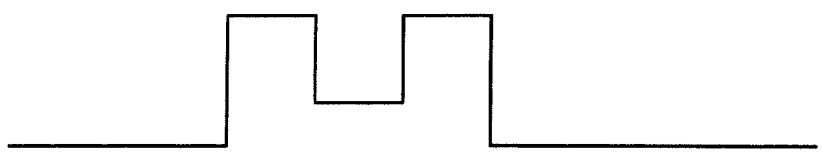

A description is made below of embodiments of a Mode S transponder transmission signal decoder and Mode S transponder transmission signal decoding method of the present invention while submitting the drawings.

Note that the following embodiments are strictly for the purpose of explaining the present invention, and do not limit the scope of the present invention. Hence, it is possible for those skilled in the art to adopt various embodiments incorporating each or the entire elements of the embodiments to be described below, and such various embodiments are also incorporated in the scope of the present invention.

Moreover, in all the drawings for explaining the following embodiments, the same reference numerals are assigned to the same elements, and duplicate descriptions of the elements concerned are omitted.

Figure 4:
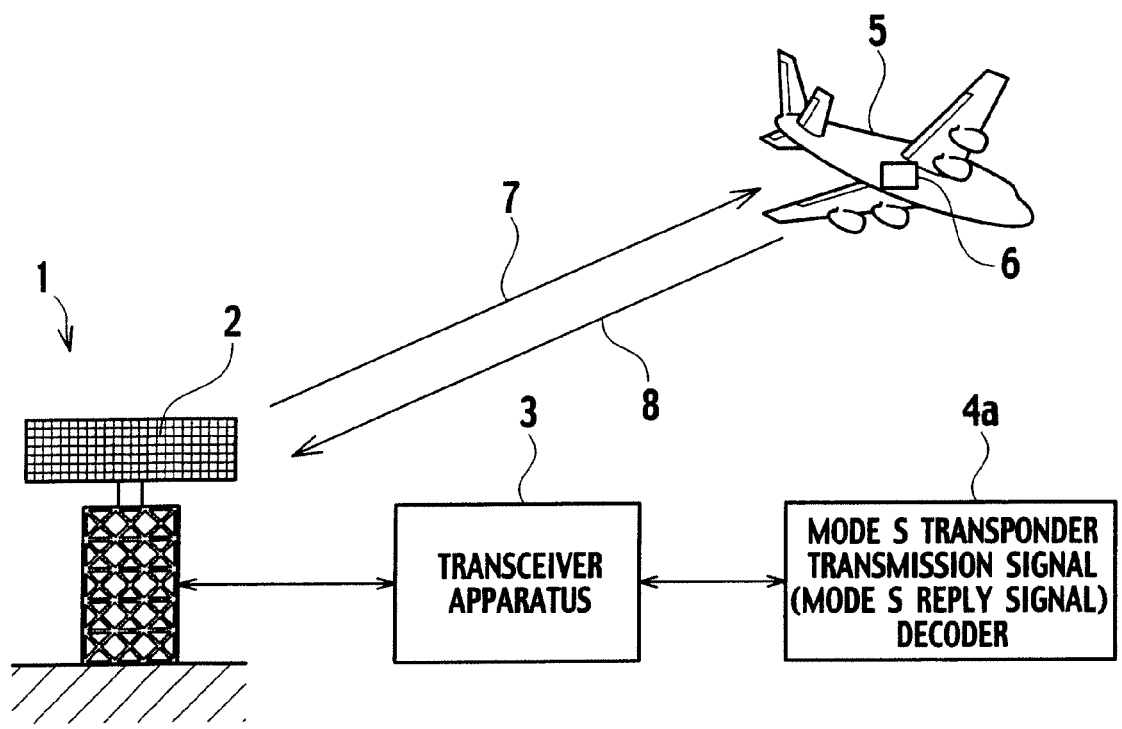
FIG. 4 is a view showing a configuration of a secondary surveillance radar system according to a first embodiment of the present invention.

FIG. 4 is a configuration view of a secondary surveillance radar (SSR) system 1 according to a first embodiment of the present invention.

The SSR system 1 is composed of a radar antenna apparatus 2 including a ground-based radar antenna rotatable at 360° in the horizontal direction, a transceiver apparatus 3, a Mode S transponder transmission signal decoder 4a, and a transponder (Mode S transponder) 6 mounted on an aircraft 5.

The transceiver apparatus 3 transmits a Mode S interrogation signal 7 to the transponder 6 through the radar antenna apparatus 2, and the transponder 6 which has received the Mode S interrogation signal 7 transmits a Mode S reply signal 8 to the received Mode S interrogation signal. The Mode S reply signal 8 is received by the radar antenna apparatus 2 and the transceiver apparatus 3, and is decoded by the Mode S transponder transmission signal decoder 4a. Specifically, the Mode S transponder transmission signal decoder 4a functions as a Mode S reply signal decoder.

Note that, in this drawing, descriptions of a generation unit of the Mode S interrogation signal, an interface unit for submitting a variety of information to a user, and the like are omitted.

FIG. 5 is a configuration diagram of the Mode S transponder transmission signal decoder 4a according to the first embodiment of the present invention, which is shown in FIG. 4.

The Mode S transponder transmission signal decoder 4a is composed of a detection unit 41, an A/D conversion unit 42, a differential processing unit 43, an auto correlation arithmetic operation unit 44, a pulse regeneration unit 45, a pulse phase locked loop unit 46, and a pulse decoding unit 47.

The detection unit 41 performs detection processing for a received RF signal, and the A/D conversion unit 42 converts the detected signal into a multilevel digital signal.

Figure 6A:
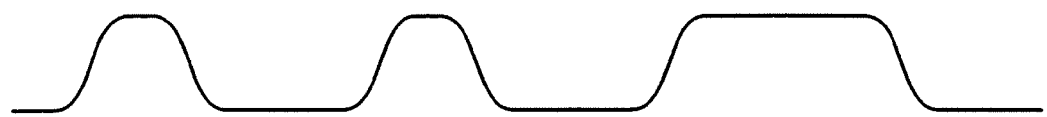
FIGS. 6A and 6B are diagrams for explaining differential processing in the Mode S reply signal decoder according to the first embodiment of the present invention.
Figure 6B:
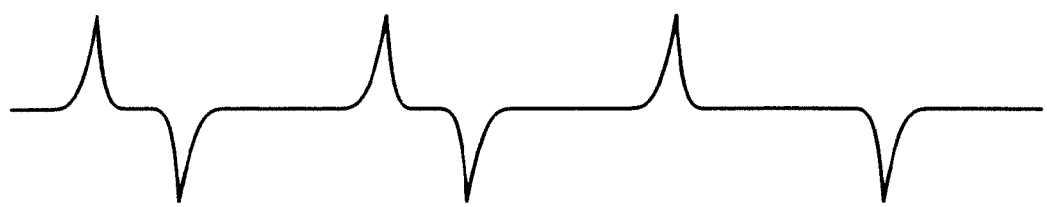

The differential processing unit 43 performs differential processing for the digital signal having a waveform as shown in FIG. 6A. The waveform of the signal which has been subjected to the differential processing becomes as shown in FIG. 6B.

The auto correlation arithmetic operation unit 44 performs auto correlation arithmetic operation processing for the differentiated signal. In this processing, a degree (power level) of auto correlation between an increasing change rate and decreasing change rate of a power level in the differentiated signal is arithmetically operated.

Figure 7:
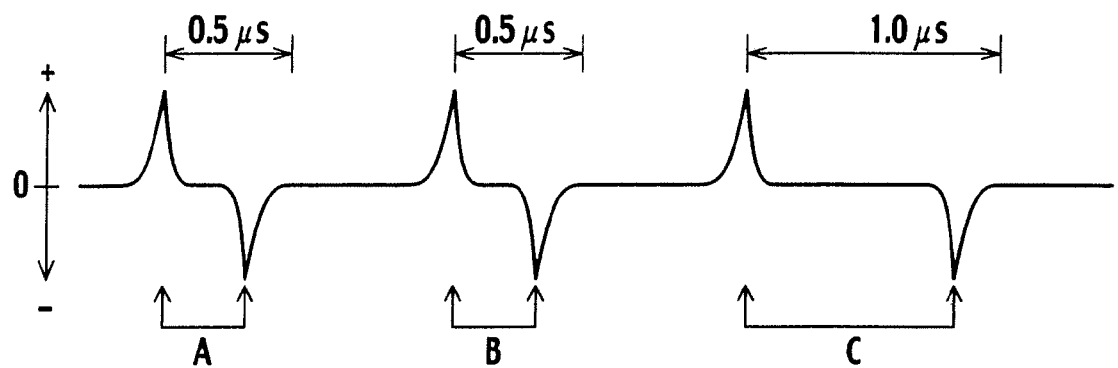
FIG. 7 is a diagram for explaining an auto correlation arithmetic operation in the Mode S reply signal decoder according to the first embodiment of the present invention.

With regard to the Mode S reply signal, a pulse width thereof is defined at 1.0 μs or 0.5 μs by a standard thereof, and accordingly, strong auto correlations appear at $P(t)\cdot(-P(t+0.5))$ and $P(t)\cdot(-P(t+1.0))$ (A, B and C in FIG. 7).

The pulse regeneration unit 45 specifies positions of pulses and regenerates a pulse row based on the degree of auto correlation and the standard of the Mode S reply signal, which are described above. Note that, in this case, a threshold value of the degree of auto correlation is used, and the pulses are regenerated on portions having the degree of auto correlation, which is equal to or more than the threshold value.

The pulse phase locked loop unit 46 performs gate processing and phase locked processing for the regenerated pulse row based on the standard of the Mode S signal.

The pulse phase locked loop unit 46 is composed of a gate processing unit 461 and a synchronization execution unit 462.

Figure 8:
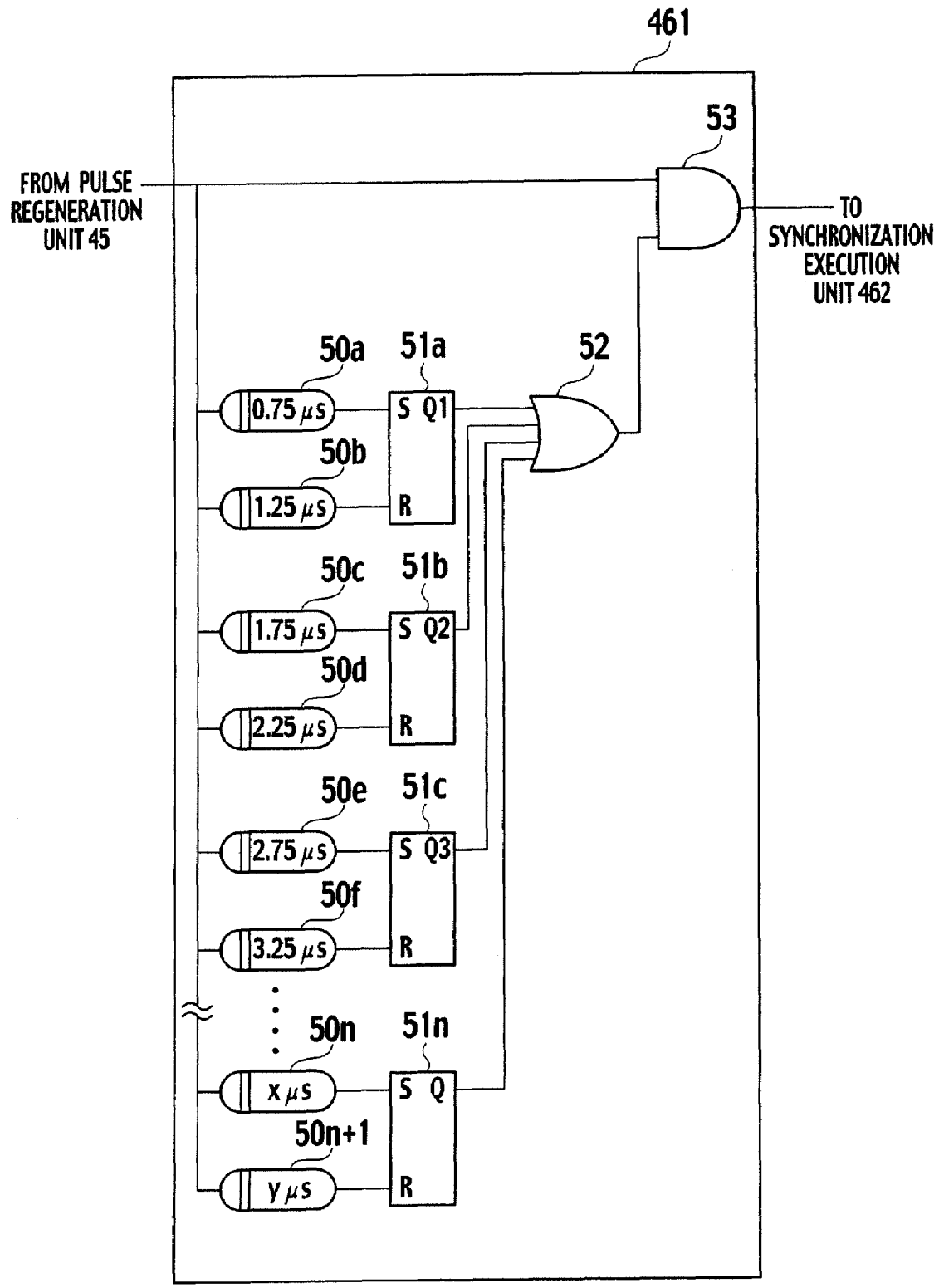
FIG. 8 is a diagram showing details of a gate processing unit of FIG. 5.

As shown in FIG. 8, the gate processing unit 461 is composed of delay circuits 50 different from one another in delay time, SR flip-flop circuits 51, an OR circuit 52, and an AND circuit 53.

Figure 9:
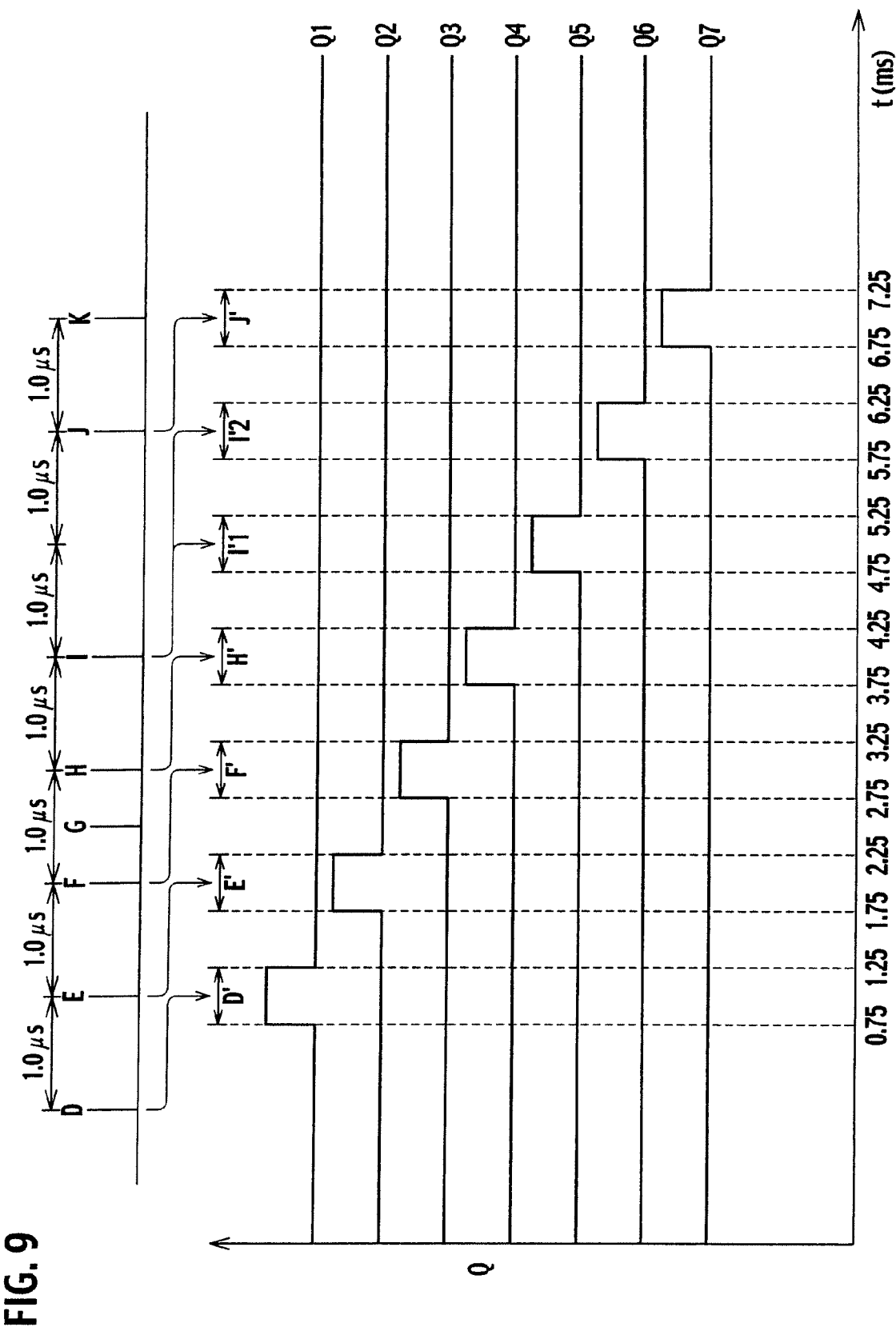
FIG. 9 is a diagram for explaining gate processing in the gate processing unit of FIG. 5.

As shown in FIG. 9, the gate processing unit 461 generates a gate of which switching time is 0.5 μs at every 1.0 μs. In the standard of the Mode S signal, the pulse width thereof is 0.5 μs, and the repetition interval of the pulse is 1.0 μs. Accordingly, an incorrect signal denoted by reference symbol G in this diagram can be prevented from passing through the gate. Hence, it is made possible to accurately perform the phase locked processing and decoding processing, which follow the gate processing.

Note that, though the case where the switching time of the gate is 0.5 μs has been shown in this embodiment, it is satisfactory, without being limited to this, if the gate generation interval is 1.0 μs according to the standard of the Mode S signal and that the switching time of the gate is sufficiently long for passing the signal therethrough.

The synchronization execution unit 462 performs the phase locked processing after the above-described gate is generated.

The pulse decoding unit 47 decodes the Mode S reply signal based on the pulse which has been subjected to the above-described gate processing and phase locked processing.

As described above, the Mode S transponder transmission signal decoder 4a in this embodiment prevents the incorrect signal from passing through the gate when the phase locked processing is performed. Hence, the Mode S transponder transmission signal decoder 4a can accurately decode the Mode S reply signal.

Figure 10:
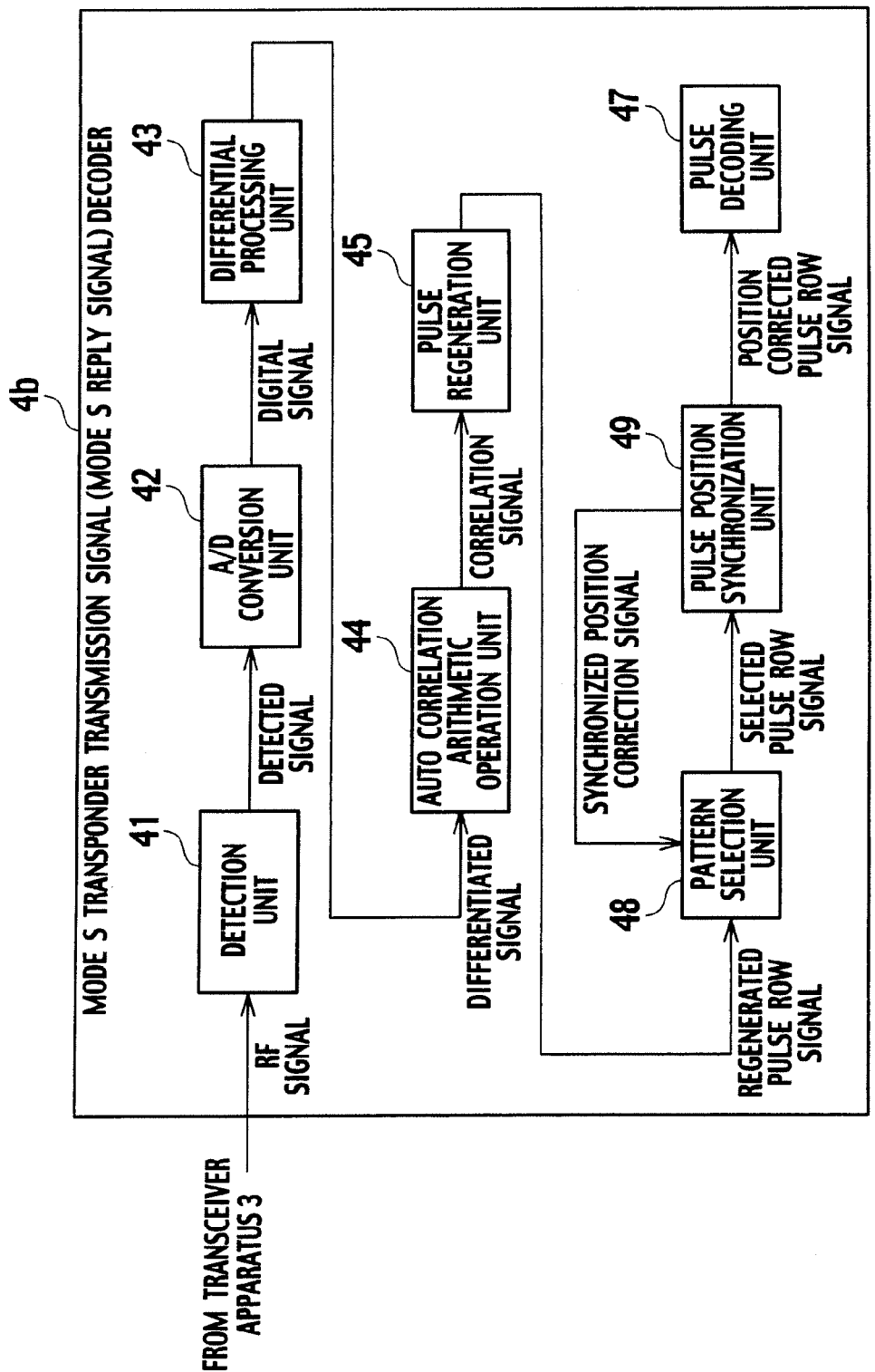
FIG. 10 is a diagram showing a configuration of a Mode S reply signal decoder according to a second embodiment of the present invention.
Figure 11A:
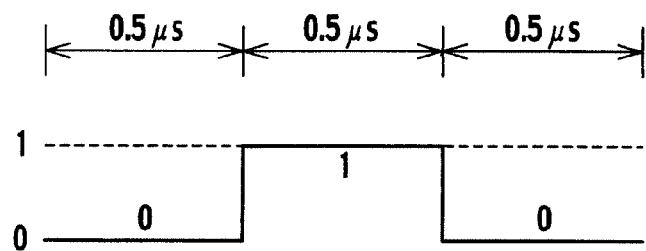
FIGS. 11A to 11D are diagrams showing patterns of a pulse of a Mode S reply signal in the Mode S reply signal decoder according to the second embodiment of the present invention.
Figure 11B:
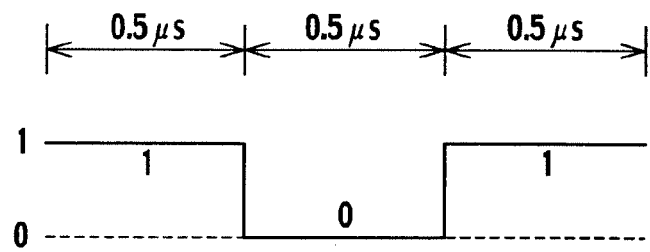
Figure 11C:
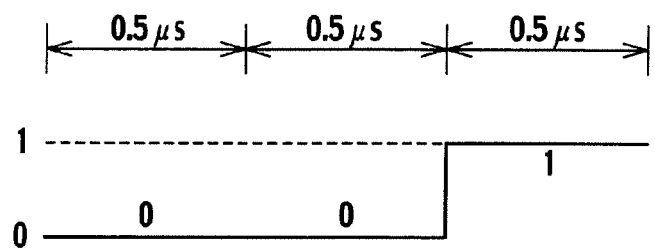
Figure 11D:
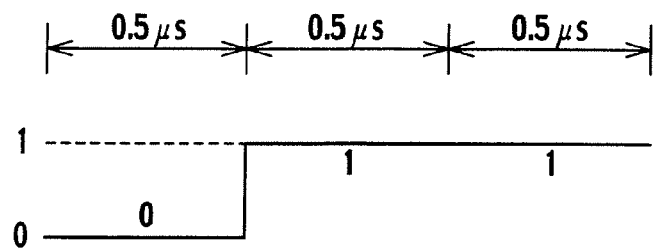

FIG. 10 is a configuration diagram of a Mode S transponder transmission signal decoder (Mode S reply signal decoder) 4b according to a second embodiment of the present invention.

The Mode S transponder transmission signal decoder 4b is one, in which a change is added to the above-described Mode S transponder transmission signal decoder 4a, and a pattern selection unit 48 and a pulse position synchronization unit 49 are provided instead of the pulse phase locked loop unit 46.

A repetition pattern of the pulse of the Mode S signal is predetermined, and is any one of patterns shown in FIGS. 11A to 11D.

The above-described pattern selection unit 48 selects a pattern of the pulse, which most closely resembles a pattern of the regenerated pulse row, from these patterns of the pulses.

The pulse position synchronization unit 49 performs pulse position synchronization processing based on the selected pattern of the pulse.

Note that, in the case of performing the above-described pulse selection, there is a possibility that an error occurs in a reference position of the pulse. Accordingly, the pulse position synchronization unit 49 calculates a correction value of the error, and gives feedback thereof to the pattern selection unit 48, and the pattern selection unit 48 sequentially corrects the reference position based on such a synchronization position correction signal obtained by calculating the correction value.

Figure 12:
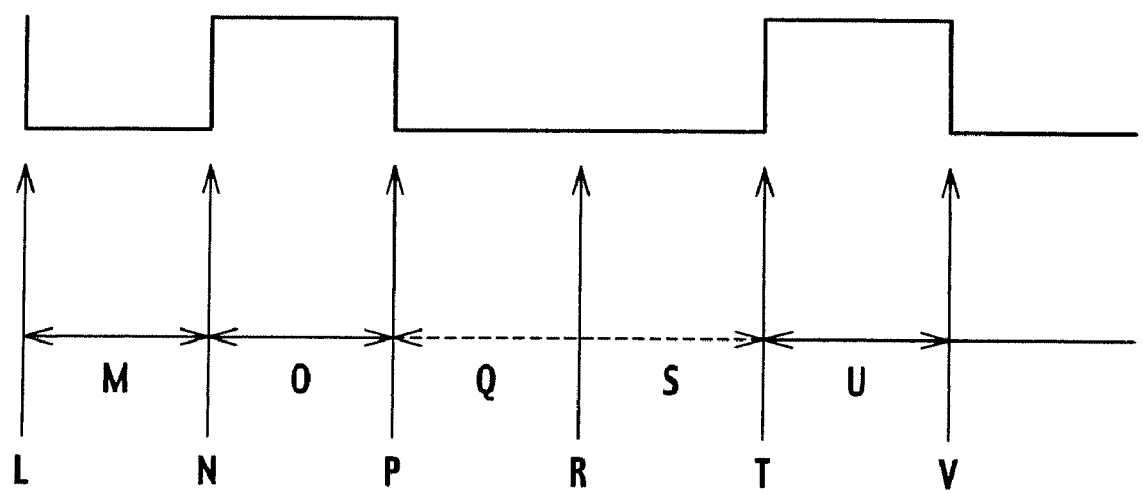
FIG. 12 is a diagram for explaining pulse position synchronization processing in the Mode S reply signal decoder according to the second embodiment of the present invention.

Details of the above-described processing are described below while referring to FIG. 12.

References in the case of performing the pulse selection are L, N, P, T, and V. The correction values in all the references are continuously calculated in such a manner that the correction value in the reference N is calculated by measuring a width of M and that the correction value of the reference P is calculated next by measuring a width of O.

Note that R cannot be the reference since the pulse is not present there, and the correction value in the reference T is calculated based on a width of a double of a section Q, that is, a width of the section Q and a section S.

The pulse decoding unit 47 decodes the above-described Mode S reply signal based on the above-described pulse which has been subjected to the pulse position synchronization processing.

As described above, in the Mode S transponder transmission signal decoder 4b of this embodiment, the appropriate pattern of the pulse is selected in advance in the case of performing the pulse position synchronization processing, and accordingly, the incorrect signal can be prevented from interposing in the pulse row. Moreover, the reference positions in the case of selecting the pattern of the pulse are sequentially corrected, and accordingly, the selection of the pulse pattern can be performed appropriately. Hence, it is made possible to accurately decode the Mode S reply signal.

In the above-described embodiments, the case has been described, where the Mode S transponder transmission signal decoder 4a or 4b of the present invention is applied to the SSR system, and these Mode S transponder transmission signal decoders 4a and 4b decode the Mode S reply signal 8 in the Mode S transponder transmission signal; however, the present invention is not limited to this.

Specifically, the Mode S transponder transmission signal decoders 4a and 4b of the present invention are also applicable to an automatic dependent surveillance broad assistance (ADS-B) system using the above-described Mode S squitter signal, and it is also possible for the Mode S transponder transmission signal decoders 4a and 4b to decode the Mode S squitter signal included in the above-described Mode S transponder transmission signal.

Figure 13:
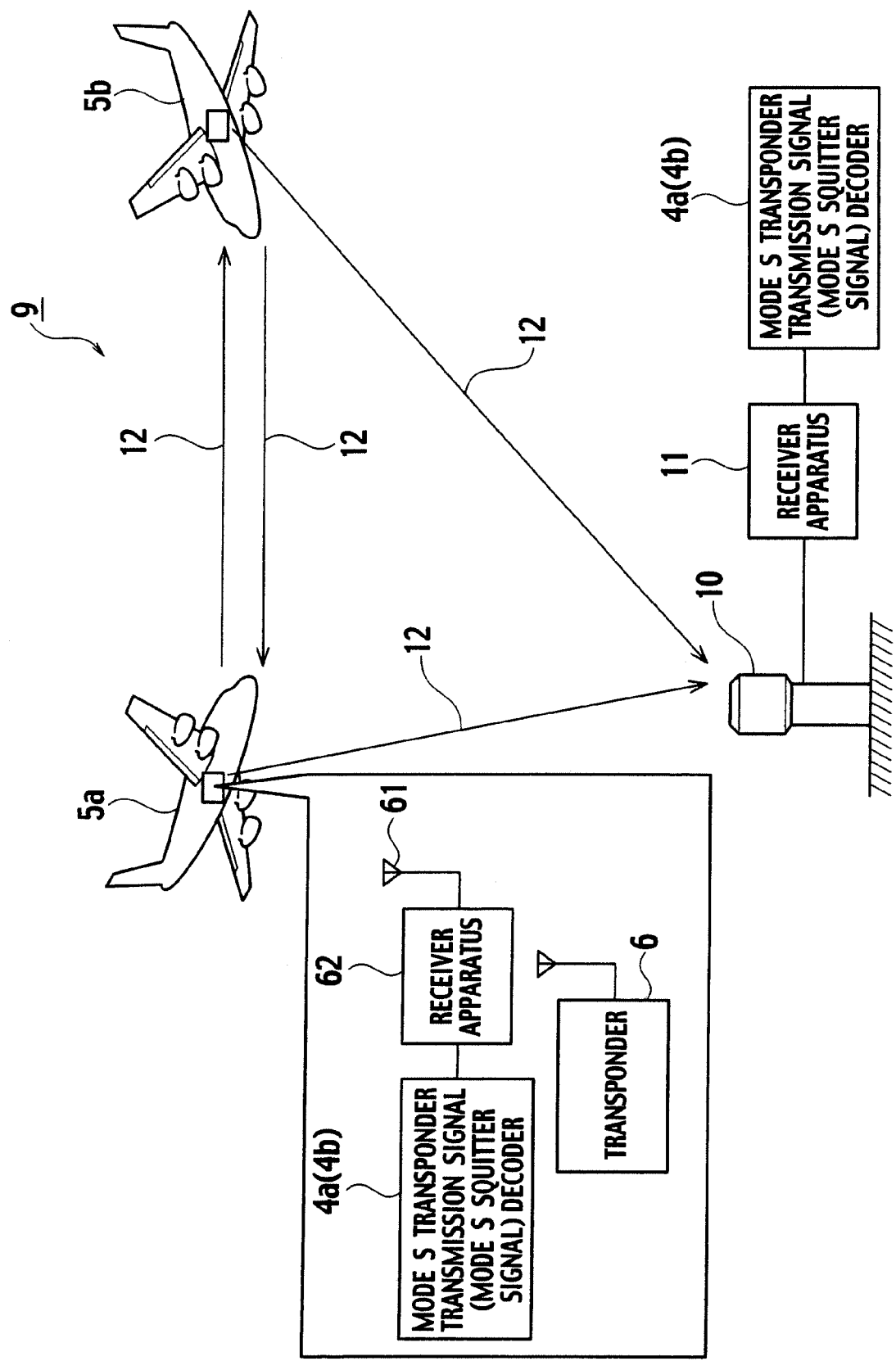
FIG. 13 is a view showing a configuration of an automatic dependent surveillance broad assistance system according to a third embodiment of the present invention.

FIG. 13 is a configuration view of an ADS-B system 9 according to a third embodiment of the present invention.

The ADS-B system 9 is composed of the transponders 6, antennas 61, receiver apparatuses 62, and the Mode S transponder transmission signal decoders 4a or 4b, which are mounted on the aircrafts 5 (two aircrafts 5a and 5b in this drawing), a ground-based omni antenna 10, a receiver apparatus 11, and the Mode S transponder transmission signal decoder 4a or 4b.

Specifically, in the ADS-B system 9 of this embodiment, the Mode S transponder transmission signal decoders 4a or 4b are provided not only on the ground but also in the aircrafts 5a and 5b.

Note that the Mode S transponder transmission signal decoders 4a or 4b of the above-described aircrafts 5a and 5b can be disposed at arbitrary positions in the aircrafts.

Each of the transponders 6 automatically transmits a Mode S squitter signal (including the Mode S short squitter signal and the Mode S extended squitter signal) 12 at a predetermined interval.

The transmitted squitter signal 12 is received by the receiver apparatus 62 of the other aircraft 5a or 5b and the receiver apparatus 11 on the ground.

Specifically, in the ADS-B system 9, not only the surveillance of the aircrafts from the ground but also the mutual surveillance between the aircrafts 5 is possible.

Moreover, though it has been difficult for the conventional surveillance radar to survey a small aircraft flying in a mountainous area and at a low altitude, it is possible for the omni antenna 10 to perform the surveillance without being affected by a terrain and a state of the subject to be surveyed since it is possible to easily dispose the omni antenna 10 also in the mountainous area.

Moreover, the above-described Mode S short squitter signal can be used for initial acquisition of the aircraft, and the like, and accordingly, the ADS-B system 9 of this embodiment can be made to function as an airborne collision avoidance system (ACAS).

Meanwhile, the Mode S extended squitter signal is one in which an amount of data transmission is increased by extending a signal length of the above-described Mode S short squitter signal, and can transmit a variety of information such as a position, speed, flight-number, and existence of an intention of diversion of the aircraft itself. Hence, the ADS-B system 9 of this embodiment can be made to function as an airborne separation assurance system (ASAS).

Furthermore, functions, configurations, and the like of the Mode S transponder transmission signal decoders 4a and 4b in this embodiment are similar to those of the above-described first and second embodiments. Hence, the Mode S transponder transmission signal decoders 4a and 4b can accurately decode the Mode S squitter signal.

<Multilateration Function>

In all the above-described embodiments, the case has been described, where each of the radar antenna apparatus 2 and the transceiver apparatus 3 (FIG. 4) and of the omni antenna 10 and the receiver apparatus 11 (FIG. 13) is one. However, three or more of each are arranged separately from one another, thus making it possible to impart a multilateration function to each of the above-described SSR system 1 and ADS-B system 9.

In multilateration, the reply signal, the squitter signal, and the like, which are transmitted from the aircraft, are received by three or more receiving stations. Next, differences in receiving time among the receiving stations are converted into differences in distance between the respective receiving stations and the aircraft, an intersection point of hyperbolas formed under a condition where such a distance difference is constant is obtained, and the position of the aircraft is thus calculated.

This multilateration can prevent lowering of surveillance performance owing to the bad weather and the like, and misidentification of the subject to be surveyed owing to a multipath error. Therefore, the multilateration is suitable for surveillance and the like for a region which is not covered with the radar surveillance on an airport surface.

Note that the Mode S transponder transmission signal decoding method using the Mode S transponder transmission signal decoder as described above is also incorporated in the scope of the present invention.

What is claimed is:

1. A Mode S transponder transmission signal decoder for decoding a Mode S transponder transmission signal transmitted by a transponder mounted on an aircraft, comprising:

a differential processing unit which performs differential processing for the Mode S transponder transmission signal;

an auto correlation arithmetic operation unit which performs an arithmetic operation of a degree of auto correlation between an increasing change rate and decreasing change rate of a power level in the signal which has been subjected to the differential processing;

a pulse regeneration unit which specifies a position of a pulse in the signal which has been subjected to the auto correlation arithmetic operation processing and regenerates the pulse based on the degree of auto correlation and a standard of a Mode S signal, the degree having been obtained by the auto correlation arithmetic operation processing;

a pattern selection unit which selects a pattern of the pulse, the pattern most closely resembling a pattern of the regenerated pulse, from patterns of pulses defined by the standard of the Mode S signal;

a position synchronization unit which performs pulse position synchronization processing based on the selected pattern of the pulse; and a decoding unit which decodes the Mode S transponder transmission signal based on the pulse which has been subjected to the pulse position synchronization processing, wherein the position synchronization unit includes a correction value calculation unit which calculates a correction value of an error when the error occurs in a reference position in a case of selecting the resembling pattern of the pulse, and the pattern selection unit sequentially corrects the reference position based on the correction value.

2. A Mode S transponder transmission signal decoding method for decoding a Mode S transponder transmission signal transmitted by a transponder mounted on an aircraft, comprising:

performing differential processing for the Mode S transponder transmission signal;

performing an arithmetic operation of a degree of auto correlation between an increasing change rate and decreasing change rate of a power level in the signal which has been subjected to the differential processing;

specifying a position of a pulse in the signal which has been subjected to the auto correlation arithmetic operation processing and regenerating the pulse based on the degree of auto correlation and a standard of a Mode S signal, the degree having been obtained by the auto correlation arithmetic operation processing;

selecting a pattern of the pulse, the pattern most closely resembling a pattern of the regenerated pulse, from patterns of pulses defined by the standard of the Mode S signal;

performing pulse position synchronization processing based on the selected pattern of the pulse; and decoding the Mode S transponder transmission signal based on the pulse which has been subjected to the pulse position synchronization processing, wherein the pulse position synchronization processing step includes calculating a correction value of an error when the error occurs in a reference position in a case of selecting the resembling pattern of the pulse, and in the pulse pattern selection step, the reference position is sequentially corrected based on the correction value.

* * * * *